(12) United States Patent
Sousa

(10) Patent No.: US 6,222,579 B1
(45) Date of Patent: Apr. 24, 2001

(54) ALIGNMENT OF LASER IMAGING ASSEMBLY

(75) Inventor: John Gary Sousa, Hudson, NH (US)

(73) Assignee: Presstek, Inc., Hudson, NH (US)

( * ) Notice: Subject to any disclaimer, the term of this patent is extended or adjusted under 35 U.S.C. 154(b) by 0 days.

(21) Appl. No.: 09/334,364

(22) Filed: Jun. 16, 1999

Related U.S. Application Data

(60) Provisional application No. 60/134,268, filed on May 14, 1999.

(51) Int. Cl.[7] ....................................... B41J 15/14
(52) U.S. Cl. ................. 347/241; 347/256; 228/49.1; 228/49.5; 385/80; 385/91
(58) Field of Search ...................... 347/241, 256; 228/165, 167, 173.5, 227, 49.5, 49.1; 385/52, 80, 83, 91, 92

(56) References Cited

U.S. PATENT DOCUMENTS

| 5,196,866 | 3/1993 | Ferschl et al. ................ 347/242 |
| 5,559,918 | * 9/1996 | Furuyama et al. ............ 385/92 |
| 5,745,624 | 4/1998 | Chan et al. .................... 385/91 |

* cited by examiner

Primary Examiner—Thinh Nguyen
Assistant Examiner—Hai C. Pham
(74) Attorney, Agent, or Firm—Testa, Hurwitz & Thibeault, LLP

(57) ABSTRACT

A fixture containing a plurality of parallel optical fibers is aligned using a solder circuit that is itself mounted on the surface. The fixture is positioned on the circuit so as to be in contact with a quantity of solder. With the solder in the molten state, the fixture is aligned with respect to an element receiving light output from the optical fibers, and the alignment is secured by allowing the solder to solidify with the fixture immobilized.

2 Claims, 2 Drawing Sheets

ALIGNMENT OF LASER IMAGING ASSEMBLY

RELATED APPLICATION

This application stems from U.S. Ser. No. 60/134,268, filed on May 14, 1999.

FIELD OF THE INVENTION

The present invention relates to digital printing apparatus and methods, and more particularly to a system for imaging of recording media such as lithographic printing members.

BACKGROUND OF THE INVENTION

U.S. Ser. No. 09/245,102, filed on Jan. 25, 1999 (the entire disclosure of which is hereby incorporated by reference) describes configurations that permit a single laser crystal to be driven by multiple pumping sources to obtain discrete, collimated outputs without substantial thermal crosstalk. FIG. 1 illustrates a generalized configuration as disclosed in this earlier-filed application. A recording medium 50, such as a lithographic plate blank or other graphic-arts construction, is affixed to a support during the imaging process. In the depicted implementation, that support is a cylinder 52 around which recording medium 50 is wrapped, and which rotates as indicated by the arrow. If desired, cylinder 52 may be straightforwardly incorporated into the design of a conventional lithographic press, serving as the plate cylinder of the press. Cylinder 52 is supported in a frame and rotated by a standard electric motor or other conventional means. The angular position of cylinder 52 is monitored by a shaft encoder associated with a detector 55. The optical components may be mounted in a writing head for movement on a lead screw and guide bar assembly that traverses recording medium 50 as cylinder 52 rotates. Axial movement of the writing head results from rotation of a stepper motor, which turns the lead screw and indexes the writing head after each pass over cylinder 52.

Imaging radiation, which strikes recording medium 50 so as to effect an imagewise scan, originates with a series of pumping laser diodes 60, four of which are representatively designated $D_1$, $D_2$, $D_3$, $D_4$. The optical components concentrate laser output onto recording medium 50 as small features, resulting in high effective power densities. A controller 65 operates a series of laser drivers collectively indicated at 67 to produce imaging bursts when the outputs of the lasers 60 are directed at appropriate points opposite recording medium 50.

Controller 65 receives data from two sources. The angular position of cylinder 52 with respect to the laser output is constantly monitored by detector 55, which provides signals indicative of that position to controller 65. In addition, an image data source (e.g., a computer) 70 also provides data signals to controller 65. The image data define points on recording medium 50 where image spots are to be written. Controller 65, therefore, correlates the instantaneous relative positions of the focused outputs of lasers 60 and recording medium 50 (as reported by detector 55) with the image data to actuate the appropriate laser drivers at the appropriate times during scan of recording medium 50. The driver and control circuitry required to implement this scheme is well-known in the scanner and plotter art.

The output of each of the lasers 60 is conducted, by means of an optical fiber $72_1$, $72_2$, $72_3$, $72_4$ to an alignment bench 75 that has a series of parallel grooves 77 for receiving the fibers. Bench 75, which may be fabricated from materials such as metal or silicon, is aligned with a laser crystal to direct the outputs of lasers 60 at appropriate points on the anterior face of laser crystal 80. To avoid substantial thermal crosstalk, the anterior face of the laser crystal (i.e., the side facing the pumping sources) may be provided with a series of parallel grooves and a pair of spaced-apart metal strips extending across the anterior face of the crystal perpendicular to the grooves. The strips and grooves serve to isolate thermomechanically the regions they define, and are aligned with the pumping sources such that the pumping-source outputs strike the anterior crystal face in the centers of the regions bounded by the strips and the grooves.

It is the emissions of crystal 80 that actually reach the recording medium 50. A first lenslet array 82 concentrates the outputs of lasers $D_1$–$D_4$ onto crystal 80, and a second lenslet array 84 concentrates the outputs from crystal 80 onto a focusing lens 85. The latter lens, in turn, demagnifies the incident beams in order to concentrate them further and draw them closer together on the surface of recording medium 50. The relationship between the initial pitch or spacing P between beams from crystal 80 and their final spacing on recording medium 50 is given by $P_f = P/D$, where $P_f$ is the final spacing and D is the demagnification ratio of lens 85. For example, the grooves 77 of bench 75 may be spaced 400 μm apart, which also determines the pitch P. If the demagnification ratio of lens 85 is 4:1, then the spots will be spaced 100 μm apart on the surface of recording medium 50.

Optimal performance requires precise alignment between fibers 72 and crystal 80. This can be difficult to achieve if, as is typically the case, bench 77 and crystal 80 are separate components mounted during assembly within a common fixture.

DESCRIPTION OF THE INVENTION

Brief Summary of the Invetion

In accordance with the present invention, an optical device—such as the grooved bench described above or other source of imaging radiation—is aligned with respect to a stationary surface using a solder circuit that is itself mounted on the surface. The solder circuit includes a quantity of solder, a resistive element associated with the solder, and terminals for establishing electrical connection to the terminals. An electric current produces heat across the resistive element, which melts the solder. With the solder in the molten state, the device is aligned with respect to the stationary surface, and the alignment is secured by allowing the solder to solidify with the device immobilized.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 2A:
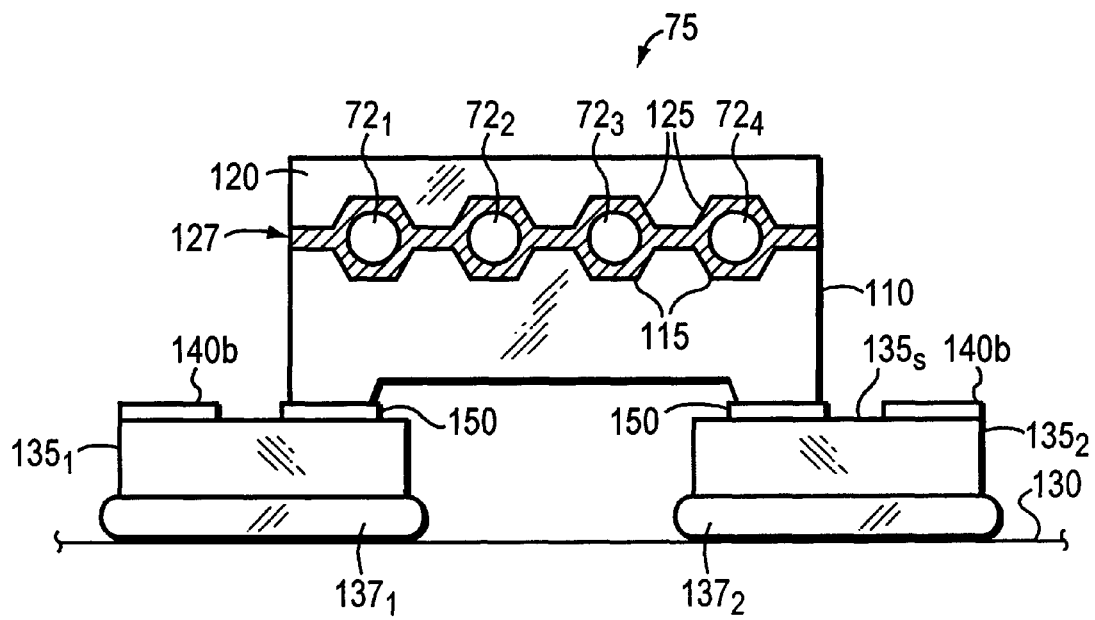
FIG. 2A is an end elevational view of a grooved bench mounted in accordance with the present invention.

As shown in FIG. 2A, a bench 75 configured for mounting in accordance with the invention includes base member 110, preferably fabricated from metal or a metal composite. Base member 110 contains a series of groove depressions 115, and a cap member 120 contains a complementary series of groove depressions 125 such that when members 110, 120 are mated, grooves 115, 125 oppose each other to form channels. To achieve the illustrated configuration, a layer of adhesive (e.g., epoxy) is applied to the grooved surfaces of members 110, 120, and the fibers 72 are placed in one of the sets of grooves. The members 110, 120 are then mated, the adhesive (indicated at 127) filling the channels and space between the members and immobilizing the members and the fibers.

The bench 75 is aligned against a stationary platform 130 (i.e., a surface stationary with respect to crystal 80, such as a fixture that will house both bench 75 and crystal 80). To accomplish this, a pair of solder-circuit fixtures $135_1$, $135_2$ are first adhered to the platform 130, e.g., by means of respective solder applications $137_1$, $137_2$. The fixtures may, for example, be fabricated of aluminum with upper surfaces 135s metallized (e.g., with gold). Base member 110 is then brought into alignment and soldered to fixtures $135_1$, $135_2$ as described below.

Figure 2B:
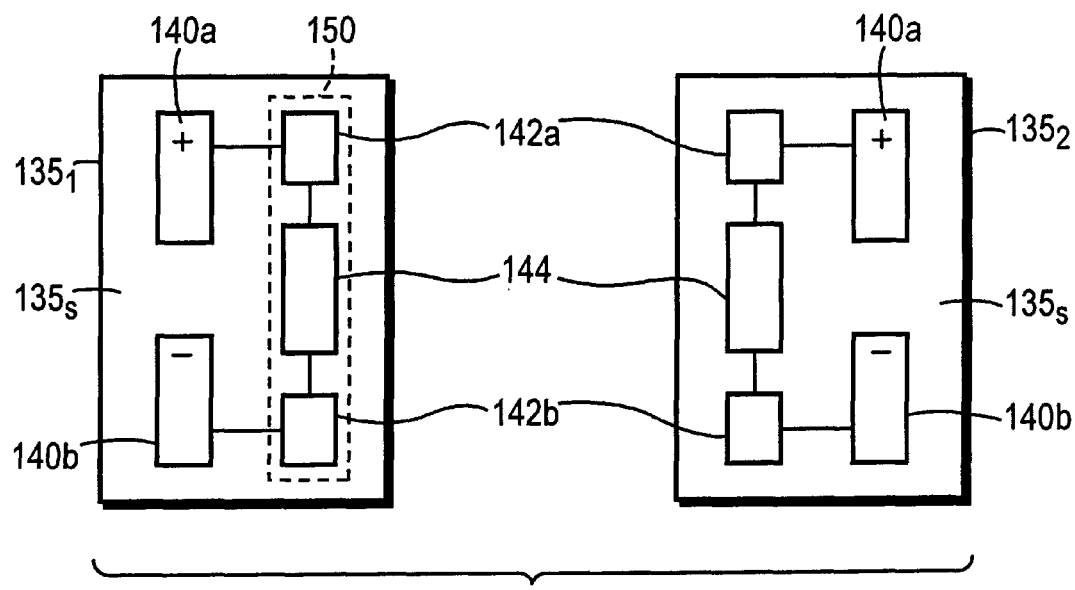
FIG. 2B is a schematic plan view of a pair of mounting fixtures in accordance with the present invention.

With reference to FIG. 2B, the surface 135s of each fixture $135_1$, $135_2$ is provided with a series of surface components to facilitate soldering. These include a pair of electrodes 140a, 140b; a pair of resistors 142a, 142b each connected to a respective electrode 140a, 140b; and a heating pad 144. Application of a voltage across electrodes 140a, 140b causes pad 144 to heat up; accordingly, if a solder preform strip 150 is placed across the heating pad 144 and resistors 142a, 142b, a suitable voltage across the electrodes will cause the solder to melt.

Figure 1:
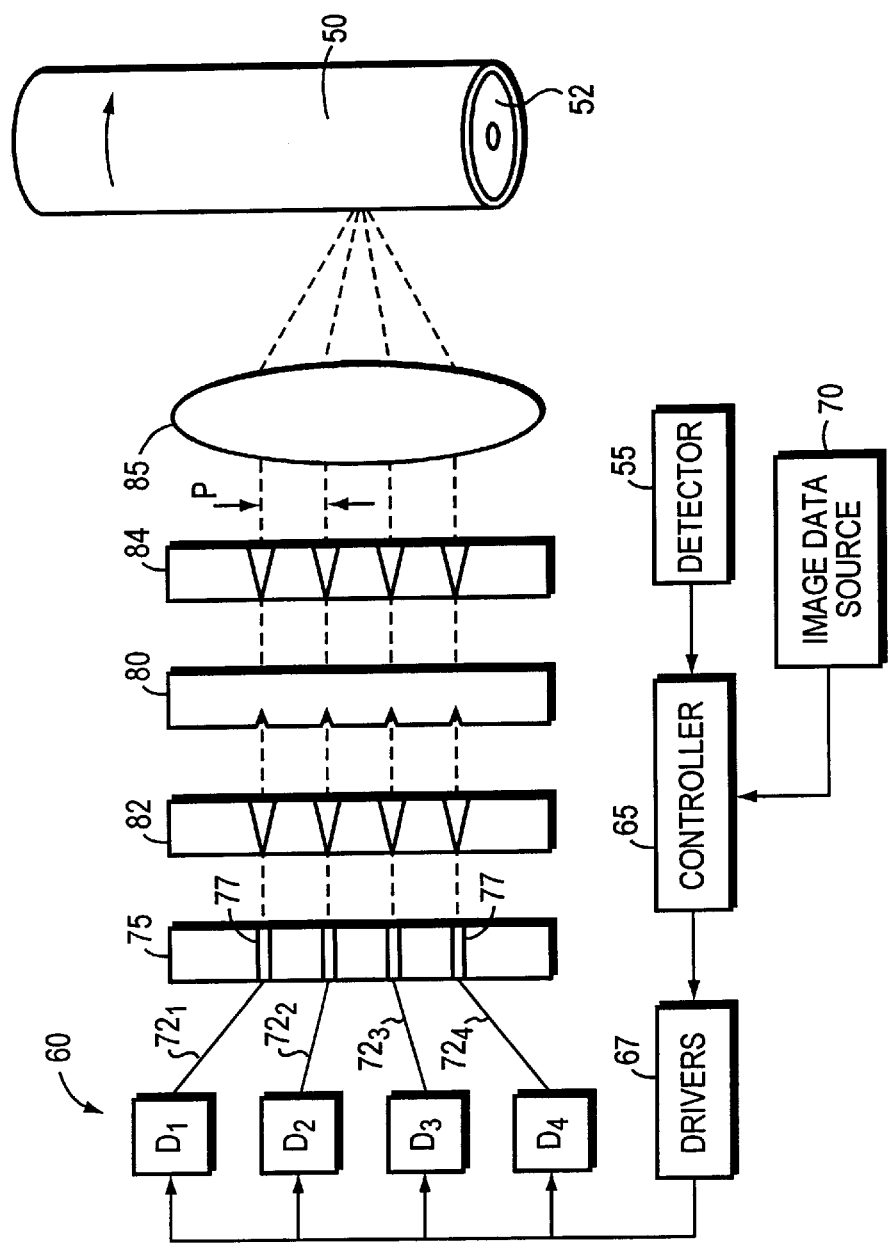
FIG. 1 schematically illustrates a prior laser-imaging configuration.

To effect alignment in accordance with the invention, solder preform strips 150 are placed on both fixtures $135_1$, $135_2$. The bottom surface of bench 75 (and preferably, as illustrated in FIG. 2A, the bottom surfaces of legs projecting from base 110) is placed on preform strips 150 in the solid or molten state—i.e., before or after voltage is applied to the electrodes. Lasers 60 (see FIG. 1) are activated, and with solder strips 150 in the molten state, bench 75 is manipulated in the molten solder until the outputs are properly aligned with another component—such as crystal 80—that is fixedly mounted on platform 130. The degree of alignment is measured by standard beam-characterizing equipment, which receives the laser beams emitted from fibers 72 and compares their profiles and intensities.

When alignment is achieved, bench 75 is retained in place, and the alignment is secured by allowing solder strips 150 to solidify. Naturally, variations to the foregoing approach are possible. For example, depending on the configuration of bench 75, a single fixture 135 may suffice. It should also be emphasized that the foregoing approach is applicable to any optical device requiring alignment; for example, bench 75 may support an optical device or devices (such as the laser itself) rather than optical fibers.

It will therefore be seen that we have developed new and useful approaches to the manufacture and assembly of optical systems applicable to a variety of digital-imaging environments. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A method of aligning a fixture comprising a plurality of optical fibers in parallel alignment, each fiber carrying a laser output, the method comprising the steps of:

a. positioning the fixture in a pool of molten solder on a stationary surface;

b. aligning the fixture with respect to the stationary surface so that the laser outputs are mutually aligned with respect to an element receiving the laser outputs; and c. securing the alignment by allowing the solder to solidify with the fixture immobilized.

2. The method of claim 1 wherein the solder circuit comprises:

a. a pair of terminals for connection to a power source;

b. at least one resistive element; and c. a quantity of solder associated with the at least one resistive element, whereby application of a voltage across the terminals causes the solder to melt.

* * * * *